United States Patent
Maes

(10) Patent No.: US 9,677,945 B2
(45) Date of Patent: Jun. 13, 2017

(54) PROJECTION SYSTEM WITH SAFETY DETECTION

(71) Applicant: Barco N.V., Kortrijk (BE)

(72) Inventor: Dirk Maes, Wevelgem (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 14/426,770

(22) PCT Filed: Sep. 5, 2013

(86) PCT No.: PCT/IB2013/058305
§ 371 (c)(1),
(2) Date: Mar. 9, 2015

(87) PCT Pub. No.: WO2014/041464
PCT Pub. Date: Mar. 20, 2014

(65) Prior Publication Data
US 2015/0219500 A1    Aug. 6, 2015

(30) Foreign Application Priority Data

Sep. 11, 2012   (GB) .................................. 1216129.5

(51) Int. Cl.
*G01J 5/10*     (2006.01)
*G03B 21/20*    (2006.01)
(Continued)

(52) U.S. Cl.
CPC .............. *G01J 5/10* (2013.01); *G01J 5/0818* (2013.01); *G01J 5/0896* (2013.01);
(Continued)

(58) Field of Classification Search
CPC   G03B 21/28; G03B 21/2033; G03B 21/2066; G03B 21/2086; H04N 9/3129; H04N 9/3161; H04N 9/3194
See application file for complete search history.

(56) References Cited

U.S. PATENT DOCUMENTS 8,297,755 B2 * 10/2012 Ritz ....................... G03B 21/26
                                                              353/119
2005/0035943 A1   2/2005 Kojima
(Continued)

FOREIGN PATENT DOCUMENTS

JP    2005134563    5/2005
JP    2006227083    8/2006
(Continued)

OTHER PUBLICATIONS

International Preliminary Report on Patentability dated Mar. 26, 2015 for Corresponding Application No. PCT/IB2013/058305.
(Continued)

*Primary Examiner* — Sultan Chowdhury
(74) *Attorney, Agent, or Firm* — Renner, Otto, Boisselle & Sklar, LLP

(57) ABSTRACT

A projection system is disclosed including a safety detection system for a protected space, said projection system including a projection light source, a projection imaging system, a projection lens system, a detection source comprising at least of a detection light source and a detection camera comprising at least of a detection sensor, characterized by the fact that the optical axis of the projection source is identical to the optical axis of the detection source and the detection camera at least in the protected space.

30 Claims, 5 Drawing Sheets

(51) Int. Cl.
*H04N 9/31* (2006.01)
*G01J 5/08* (2006.01)
*G02B 26/08* (2006.01)
*H04N 5/74* (2006.01)
*G02B 27/14* (2006.01)

(52) U.S. Cl.
CPC ..... *G02B 26/0833* (2013.01); *G03B 21/2033* (2013.01); *G03B 21/2086* (2013.01); *H04N 5/7458* (2013.01); *H04N 9/3161* (2013.01); *H04N 9/3194* (2013.01); *G02B 27/141* (2013.01)

(56) References Cited

U.S. PATENT DOCUMENTS

| | | | |
|---|---|---|---|
| 2005/0128578 A1* | 6/2005 | Sugawara | H04N 5/74 359/443 |
| 2008/0046150 A1* | 2/2008 | Breed | B60R 21/0134 701/45 |
| 2008/0174742 A1 | 7/2008 | Ito | |
| 2009/0147224 A1* | 6/2009 | Kurozuka | H04N 9/3129 353/98 |
| 2010/0245780 A1* | 9/2010 | Abe | G03B 21/14 353/85 |
| 2011/0285910 A1 | 11/2011 | Bamji et al. | |
| 2013/0044912 A1* | 2/2013 | Kulkarni | G06K 9/00671 382/103 |
| 2014/0139717 A1* | 5/2014 | Short | H04N 7/142 348/333.1 |

FOREIGN PATENT DOCUMENTS

| | | |
|---|---|---|
| WO | 2008/032244 | 3/2008 |
| WO | 2009/031094 | 3/2009 |
| WO | 2011/012168 | 2/2011 |

OTHER PUBLICATIONS

International Search Report and Written Opinion dated Feb. 21, 2014 for Corresponding Application No. PCT/IB2013/058305.

* cited by examiner

PROJECTION SYSTEM WITH SAFETY DETECTION

This application is a national phase of International Application No. PCT/IB2013/058305 filed Sep. 5, 2013 and published in the English language.

TECHNICAL FIELD OF THE INVENTION

The current invention relates to a projection system with safety detection.

BACKGROUND OF THE INVENTION

Projecting systems used to project still images, motion pictures or visual effects on a projection surface are widely used nowadays in for example cinemas, home cinemas, presentation rooms, exhibition areas, light shows, etc. . . . . In most implementations (see FIG. 1), a projection light source (1) generates a light beam that is guided onto a projection imaging system (2) that will generate the individual pixels containing the colour and brightness of the image to be projected. Then, the light is sent through a projection lens system (3) that will shape, position and focus the projection cone (14) before being projected on the projecting surface (20). This surface can be a flat surface when used for motion pictures or presentation material, but can also be irregular as for example used for the projection of images and motion pictures on buildings. A surface can also be completely absent in the case of light shows Laser light sources are becoming an attractive projection light source as alternative to traditional lamps and LEDs. They have many advantages over these traditional sources such as a longer lifetime, extended colour gamut and increased brightness making them particular interesting for high brightness projection systems. Also the costs are evolving positively and in the coming years compact low cost laser diodes are expected to become available. Their main drawback however is the stringent safety regulations restricting their use. Laser devices are classified in safety classes according to their wavelength and intensity. Only class 1 and 2 lasers can be used freely. However, for a projection system, the output power of the laser source will exceed the emission levels of these two classes. Therefore a safety system must be included in the projecting system that will detect the presence of a person or an animal in the space where the projection cone can expose the person or animal with excessive laser light. This space that the safety system must at least cover is referred to as the protected space. This can be done be shutting down or reducing the laser light partially or completely. Moreover, a reflective object (21) might be exposed to the projection light (17), reflecting the laser light to a person or animal (22) that is not directly positioned within the projection cone (14). Therefore, also the presence of a reflective object (21) has to be detected even if it is relatively small.

U.S. Pat. No. 6,002,505 discloses a safety detection system for a laser projection system where a detection camera (9) including a sensor or sensor array (7) is used to detect the presence of an object in the laser projection cone (14) by sensing at least the volume of the projection cone, i.e. the protected space. The sensing can be done by different means like thermal measurement, acoustic measurement or electromagnetic measurement. It also includes a detection source (6) used for the irradiation of acoustic or electromagnetic waves. These waves are then reflected by the projection surface or objects and sensed by the detection camera (9), i.e. the sensors. Both the detection camera(s) (9) and detection source(s) (6) are placed nearby the projection system.

In U.S. Pat. No. 6,361,173 discloses a more specific detection system where an infra-red light source is used as detection source (4) and an infra-red camera is used as detection camera (9). Both are placed next to the projection source (1) and used for the detection of a person in protected space. In this application, the detection system is then used to turn off part of the projection light source preventing a person from being blinded.

Both prior art solutions described above have the intrinsic property of being susceptible to blind spots. Close by the lens or light source of the projecting system there will always be spots were an object will not be illuminated by the detection source and hence the detection system will fail. In some embodiments, this drawback has been overcome by putting up multiple detection sources and cameras around the projection source. However, although this limits the blind spot near the projection source drastically, it can never eliminate it. Moreover, one can prove that in the case of a reflective object there will always be blind spots in the reflected area disregarding of the amount of detection sources and detection cameras that are used and disregarding whether the reflective object itself is in a blind spot or not. A second drawback of these prior art solutions is that the detection system has to be adjusted every time the projection source is changed, i.e. when another lens is mounted, when the zoom position of the lens is changed or when the lens is shifted.

SUMMARY OF THE INVENTION

The proposed invention solves these issues.

Thus, the invention relates to a projection system including a safety detection system for a protected space, said projection system including a projection light source (1), a projection imaging system (2), a projection lens system (3), a detection source light (4) and a detection sensor (7), characterized by the fact that the optical axis of the projection source (11) is identical to the optical axis of the detection light source (12) and the detection sensor (13) at least in the protected space.

This optical alignment guarantees that the detection source cone (15) and detection camera cone (16) completely overlaps the projection cone (14), i.e. the protected space. Every object in the protected space will now be illuminated by the detection source cone (15) and detected as it falls within the camera detection cone (16), so blind spots are excluded. Moreover there will be no blind spots in the reflective area of a reflective object or in the reflective area of a second reflective object that is on its turn positioned in the reflective area of a first reflective object.

In a preferred embodiment of the invention, the detection sensor (7) is a Time of Flight (ToF) sensor. This sensor can not only make an image but can also determine the distance to the detection sensor of every object it detects. An Infra Red (IR) LED light is used for the detection light source (4) having the advantage that it is invisible to the human eye. Therefore, it can be used during projection. The ToF detection sensor (7) and the IR source light (4) are operated in a pulsed regime with repetition rates up to 80 MHz; As imaging system (2), a Digital Light Processing system is used comprising of a TIR prism assembly (120) and colour splitting prism assembly (130). The alignment of the optical axis of the IR light and the ToF detection sensor is done by a beam splitter forming together a detection subsystem. Said subsystem is inserted in the projection light path just after the integrator rod which combines the green, red and blue laser light components into a uniform white spot. The insertion of the subsystem combines its optical axis with that of the laser light by means of a dichroic mirror. This combined light is then directed to the TIR prism by an optical system. In the colour splitting prism assembly, the detection light is guided towards the red DMD imager by appropriate reflective coatings on the prisms faces. A bonded slanted microstructure with IR reflective coating prevents the detection light from hitting on the red imager, but instead reflects it in the optical path of the red light component.

The invention shall be better understood in light of the following description and of the accompanying drawings were FIG. 1 shows a projection system with a safety detection system of the prior art.

DETAILED DESCRIPTION

Figure 1:
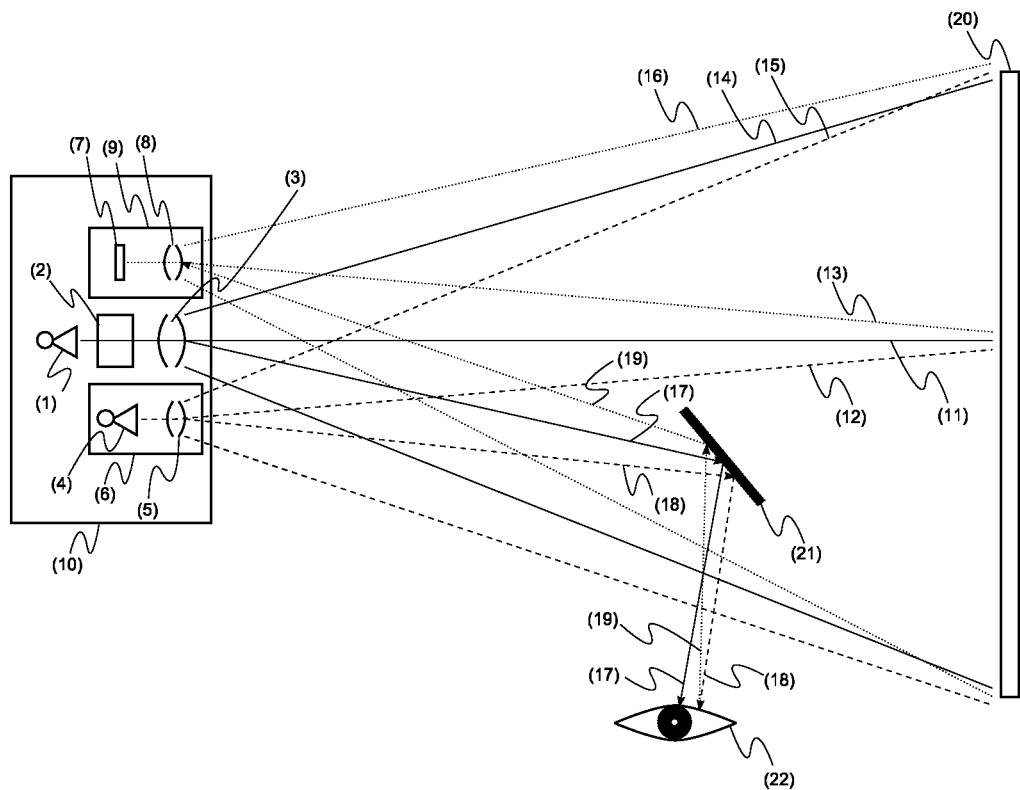
Figure 2:
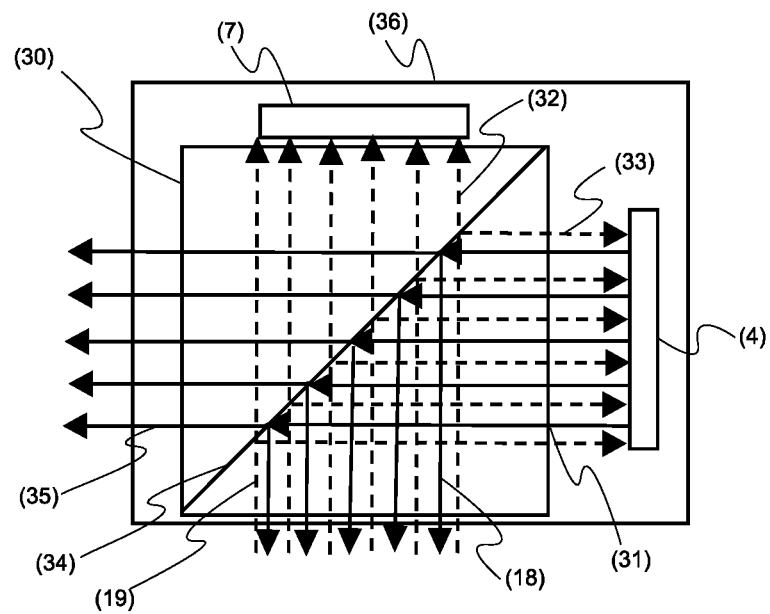
FIG. 2 shows a detection subsystem according to the invention illustrating the combination of the optical axis of the detection light source and the optical axis of the detection sensor by means of a beam splitter.

As a first step towards specific embodiments of the invention, the optical axis of the detection sensor (7) and the optical axis of the detection light source (12) are made identical in a detection sub-system. In a first embodiment of said detection subsystem, this is achieved by beam splitting of the detection light (18) and reflected detection light (19). FIG. 2 shows such a detection subsystem (36) with the detection light source (4), detection sensor (7) and beam splitter (30). The irradiated detection light (31) that is irradiated by the detection light source (4) is reflected internally in the beam splitter (30) on a partially reflective surface (34). The reflected detection light (19) that was reflected back from an object or the projecting surface (20) will enter the beam splitter and will partially (32) hit on the detection sensor and partially be reflected (33) to the detection light source (4). The amount of reflection depends on the specific implementation of the beams splitter (30).

One preferred type of beam splitter (30) that can be used is a Polarizing Beam Splitter or PBS. When the light (31) irradiated by the light source (4) hits on the reflective surface (34) of the PBS, only one polarization of the detection light source (4) is directed towards the protected space. If the detection light source (4) is already polarized no light is lost, otherwise about 50% of the light (35) will pass straight through the PBS. It is also possible to insert a polarizer in between the detection light source (4) and the PBS (30) to make sure only polarized light is entering the PBS. The person, animal or object to be detected will provide a diffuse reflection of the light and therefore the light returning (19) to the detection subsystem (36) will at least be partially depolarized. Only part of the reflected light (32) will have the appropriate polarization to pass the PBS (30) towards the detection sensor (7), the remainder will be reflected towards the detection light source (4). Even if a polarized detection light source (4) is used such as an Infra-Red laser for example, the sensitivity will be reduced by at least a factor 2. If the detection light source (4) is not polarized the overall sensitivity is reduced by at least a factor 4. Also a non-polarizing beam splitter, 50% mirrors for example, can be used, but then the efficiency is reduced to 25% as more power is needed for the detection light source (4). However, the general principle remains the same.

In a second embodiment of the sub-system that makes the optical axis of the detection sensor (7) and detection light source (4) identical, one uses photosensitive elements and detection light emitting elements that are integrated on a single semiconductor substrate. Such so called bidirectional sensors have been demonstrated by the Fraunhofer institute using green OLED emitters (http://www.oled-info.com/fraunhofer-shows-new-bi-directional-oled-microdisplay-can-measure-distances).

Figure 3:
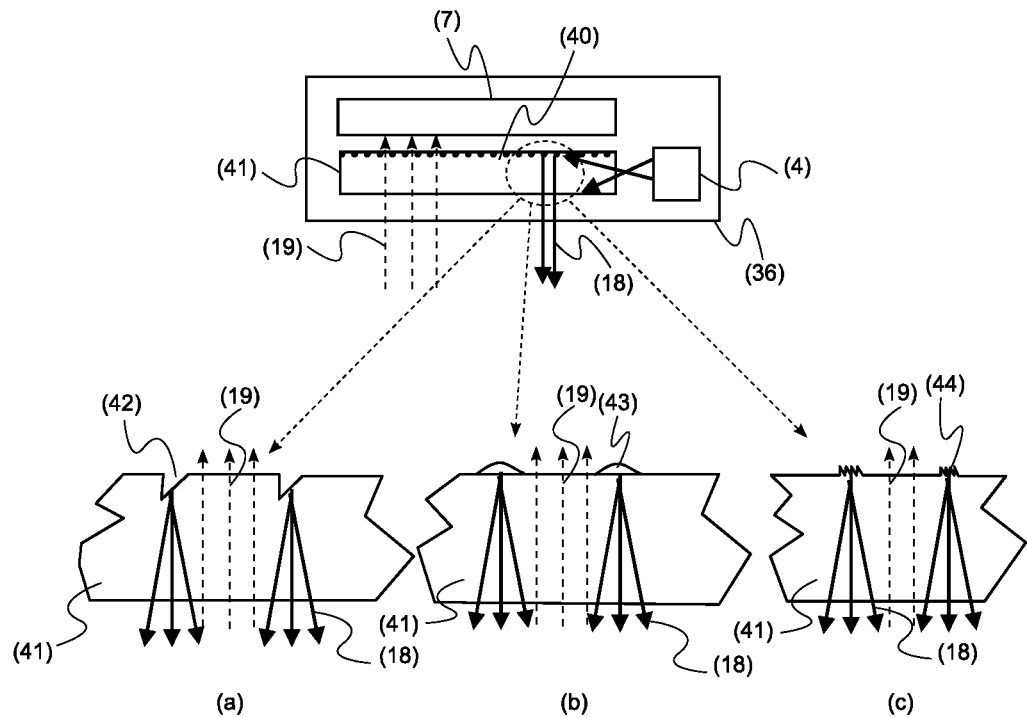
FIG. 3 shows another embodiment of a detection subsystem according to the invention illustrating the combination of the optical axis of the detection light source and the optical axis of the detection sensor by means of a light guide.

In a third embodiment of said detection sub-system (see FIG. 3), the combination of the optical axes can be achieved by the use of a light guide (41) placed in front of the detection sensor (7). The light guide is based on similar technology as edge lit backlights. By adding a patterned dot structure (40) on the light guide it is determined where the light is coupled out from the light guide. Ideally this pattern is placed in the inactive areas between the sensor pixels of the detection sensor (7). Due to the small size of the detection sensor pixels it might be challenging to achieve this level of precision and alignment. Alternatively a random pattern of dots could be used. The dot size is preferably smaller than the size of a sensor pixel. It is important that the dot pattern directs the light as much as possible to the front so that the detection light (18) does not scatter back towards the detection sensor (7). The effect of this backscattering can be reduced if a polarized detection light source (4) is used and if a cleanup polarizer is used between the camera detection sensor (7) and the light guide (41). In FIG. 3 a couple of possible implementations of the dot pattern are illustrated. In FIG. 3(a), a refractive structure (42) is used to deflect the light (18) in the light guide (41) via total internal reflection. In FIG. 3(b), a pattern of white painted dots (43) is used to provide a diffuse reflection of the light (18) in the light guide (41) incident on the dots. In FIG. 3(c), a refractive structure (44) is used to diffract the light (18) in the light guide (41) at certain positions. The advantage of the spatial interleaving is a more compact and potentially a more light efficient solution compared to the setup with the beam splitter.

In any of the embodiments of said detection subsystem, a lens system can be used in front of the detection sensor (7) or detection source light (4) to match the size of the reflected detection light (19) with the size of the detection light (18).

In any of the embodiments of the invention, one could use an invisible light source with a wavelength different than the projection light source (1) as detection light source (4). This has the advantage that it does not intervene with the projected light; hence the safety detection system can operate during the projection of projection light. One specific detection light source (4) that is preferably used is an infra-red light source.

In any of the embodiments of the invention, a Time of Flight (ToF) sensor can be used as detection sensor (7). This type of sensor has the advantage that it can measure the distance to any object in the detected space. To do so, the detection light source sends a light pulse and the ToF sensor measures the time between the start of the light pulse and receipt of the reflected light pulse. This time difference is a direct indication of the distance from the object to the detection sensor. Therefore, this ToF sensor can sense if an object (21) is a reflective object and if it reflects the projection light (17) to any person, animal or object (22) that is within a harmful distance of the projection light source (1).

In a preferred embodiment of the invention the detection subsystem (36) is placed after the projection lens system (3), i.e. the optical axis of the projection light (11) is combined with the optical axis of the detection subsystem (12) and (13) after the projection light (17) has travelled through the projection lens system (3). To combine the optical paths, a dichroic mirror can be used. The detection subsystem (36) needs to have its own lens system said detection lens system that has magnification, shift and angular acceptance characteristics that are matched to those of the projection lens (3). This way, the detection source cone (15) and hence detection camera cone (16) can be made identical or greater than the projection cone (14) in order to cover the protected space. The light load and quality requirements for this detection lens system are significantly less than those of the projection lens system (3). Therefore, cheap plastic lens elements (e.g. Fresnel lenses) can be used for the detection lens system. In a system where the projection system is fixed to a specific location, the settings of the detection lens system could be adjusted at installation time so that the detection cone (15) covers the projection cone (14) in all zoom positions and shifts of the projection lens system (3). In this case complex synchronized motorizations can be avoided while there is no impact on the projectors internal optics and therefore retrofits of a detection subsystem (36) to existing projection systems are possible. To make the adjustments of the detection lens system easier, the detection light source (4) may also contain a contribution of visible light or may be switchable or exchangeable between an invisible (infra-red for example) and a visible light source.

Figure 4:
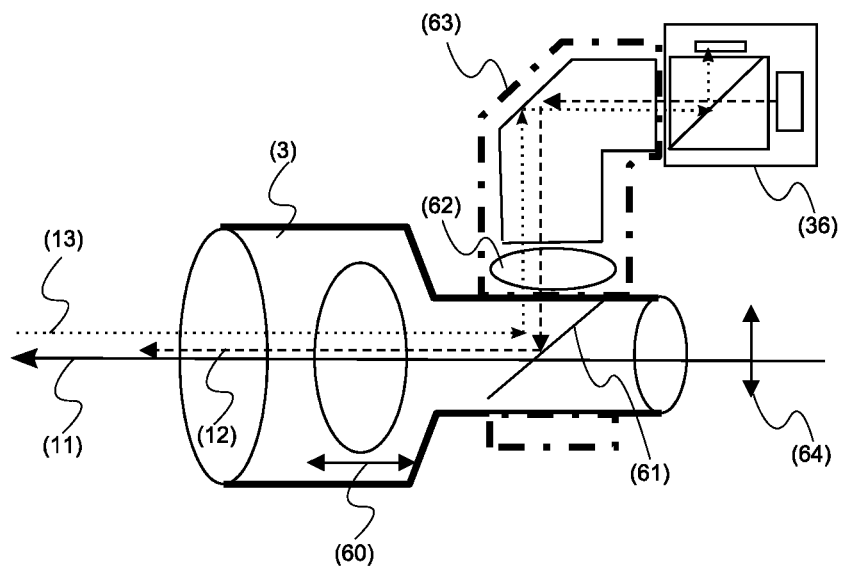
FIG. 4 shows a further embodiment of the system of the invention.
Figure 5:
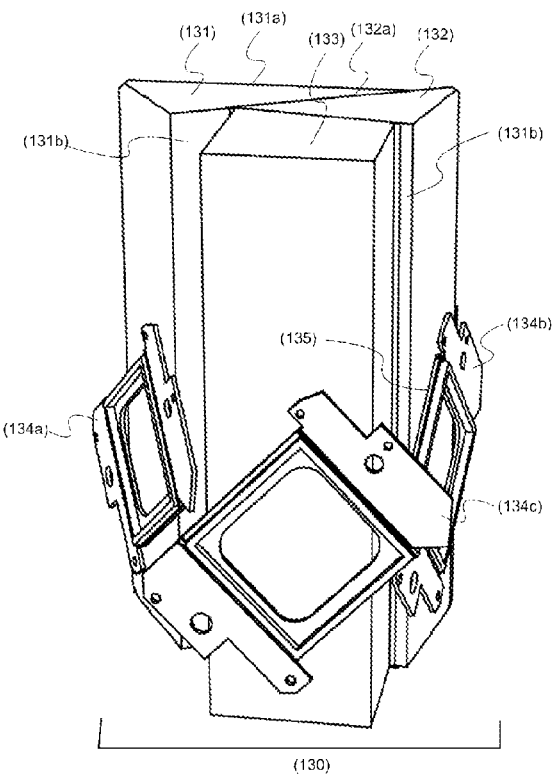
FIG. 5 shows a colour splitting prism assembly (130) according to the preferred embodiment of the invention.

In another preferred embodiment of the invention, as illustrated in FIG. 4, the optical path (12) and (13) of the detection subsystem (36) is combined with the optical path of the projection light (11) inside the projection lens system (3). When the projection lens system (3) is a zoom lens, then the preferred embodiment is to do the combination of the optical axes before the zoom group (60) as it is also illustrated in FIG. 5. In this case the zoom adjustments are applicable to both the projection light and the detection subsystem. The detection subsystem (36) can be integrated within the projection lens (3) or within the lens mount. The latter option is preferred as it allows easier integration with the projector and if a family of zoom lenses is used with a single projector, the detector cost is not multiplied with the number of zoom lenses in the family. Moreover, when the detection subsystem (36) is attached to the fixed part of the lens mount, it is possible for the system to respond to lens shift (64) simultaneously for the projection light (11) as for the detection light (12) and (13). For the combination of the optical paths a dichroic mirror (61) is integrated inside the lens and the lens barrel is opened allowing the entrance of the detection light (12) and escape of reflected detection light (13). The preferred position of the mirror (61) is in between the first lens element (closest to the projector) and the moveable lens group (60). An optical path similar to the one of the projection light is created for the detection light by inserting a lens (62) identical to the last lens of the projection lens and a glass block (63) that, together with the detection subsystem (36), creates an optical path length similar to the one inside the projector. This whole part consisting of the lens (62) and glass block (63) is mounted onto the lens clamp system of the lens mount and will therefore move together with the projection lens (3) if shift (64) is applied. The detection subsystem is mounted onto the fixed part of the lens mount or onto the chassis of the projector.

In another preferred embodiment of the invention, the optical axis (12) and (13) of the detection subsystem (36) is combined with the optical axis of the projection light source (11) before the projection lens system (3). The projection lens system (3) can then be used simultaneously for shaping the projection cone (14) and the detection source cone (15) and for receiving the reflected detection light (19). Such a solution is especially advantageous in a system with exchangeable lenses or when the lens system (3) is a zoom lens or when it provides lens shift. A change in any of these parameters will automatically have the same effect on the detection light (18), the projection light (17) and the reflected detection light (19). The combination of the optical axis of the projection source and the detection subsystem can be achieved by the insertion of a beam splitter in the optical path between the imaging system (2) and projection lens (3).

Figure 6:
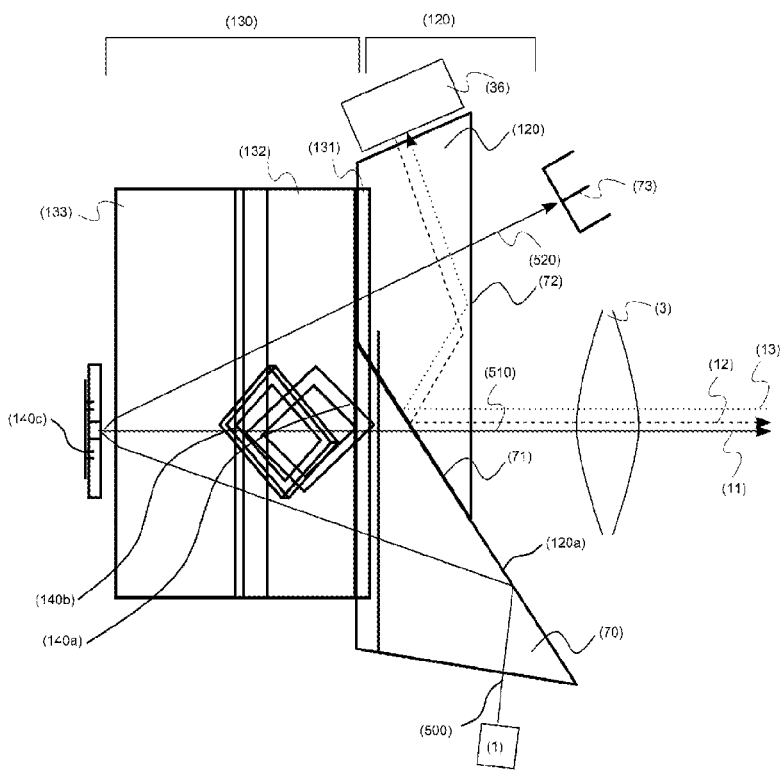
FIG. 6 shows a further embodiment of the system of the invention.

In another preferred embodiment, a Digital Light Processing (DLP) system is used as imaging system (2). A typical front view is shown in FIG. 6 and a top view in FIG. 9. The light (500) coming from the projection light source (1) and containing different colour components (Red, Green and Blue (RGB) for example) enters a Total Internal Reflection (TIR) prism assembly (120) and is reflected on said TIR prism (120) face (120a) into a colour splitting prism (130). Said colour splitting prism (130) (see also FIG. 5) splits the light (500) in its different colour components (500a), (500b) and (500c) and projects these light components onto the respective Digital-Micromirror-Device imagers (140a), (140b) and (140c). These imagers have an off- and on-state for every pixel of the projected image. If the pixel is in the off-state, the light is reflected (520) to an off-state heat sink (73). If the pixel is in the on-state, the light (510a), (510b) or (510c) is reflected back into the colour prism assembly (130) and combined to form the projection light (510) and (17). This light leaves then the imaging system and enters the projection lens system (3).

FIG. 6 illustrates a preferred embodiment of the invention where the combination of the optical axes is done before the projection lens (3) and where such a Digital Light Processing or DLP system is used as imaging system (2). This is achieved by growing the height of the TIR prism (120) and applying a dichroic reflective coating (71) on one of the surfaces of the TIR prism (120a). This can be done without increasing the back focal length of the projection lens (3). The reflected detection light (13) received via the projection lens (3) will be deflected by the dichroic coating (71) and undergo total internal reflection on the front surface (72) of the TIR prism (120) before hitting the detection subsystem (36). The shape and size of the extended TIR prism (120) part can be adjusted such that the backworking distance between the detection sensor (7) and the projection lens (3)

is matched to the backworking distance between the DMD imaging chips (140c), (140b) and (140a) and the projection lens system (3). Preferably, the backworking distance is slightly different such that when the projection image is focused onto the projection surface, the reflected detection light (13) is focused at the typical area of interest, for example a couple of meters in front of the projection lens system (3). Adjustment capabilities can be provided. The above assumes that the detection sensor in the detection subsystem (36) and the DMD imaging chips (140c), (140b) and (140a) have identical sizes. This might not be the most practical and economical solution. A magnification system can be used to image a detection sensor onto position near the TIR prism with matched dimensions. Folding mirrors can be included in this magnification system for the convenience of integration into the projecting system. Because of the elongated TIR prism (120), the DLP off-state light (520) will now pass through this elongated TIR prism (120). The off-state heat sink (73) that absorbs this rejected off-state light (520) will need to be brought forward.

Figure 7:
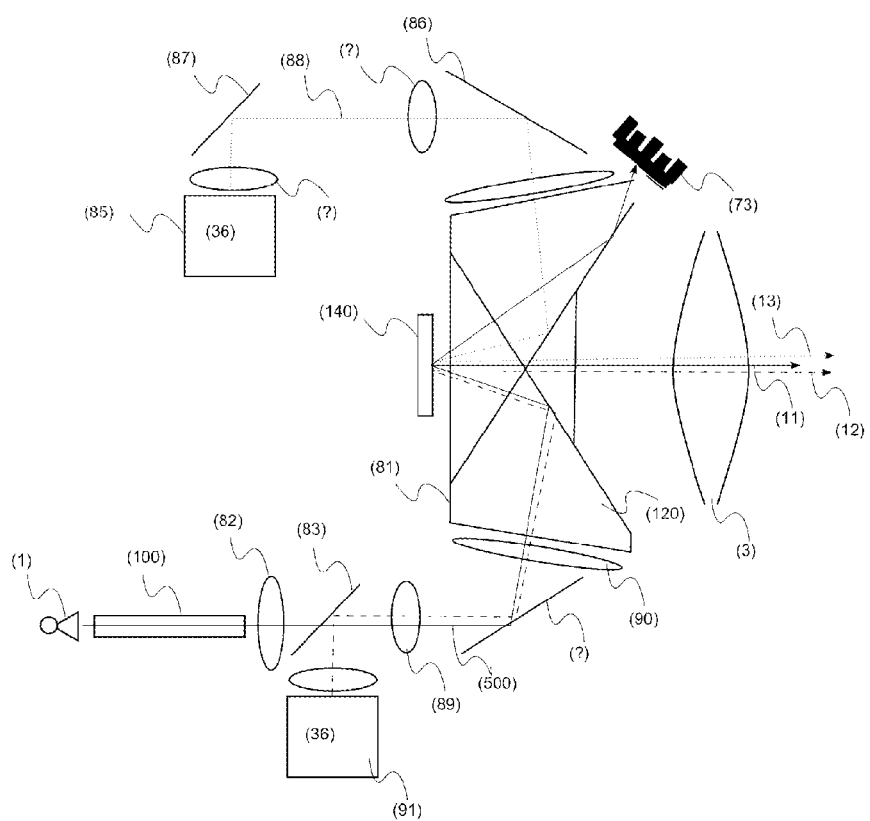
FIG. 7 shows a still further embodiment of the system of the invention.

In another preferred embodiment of the invention as illustrated in FIG. 7 where the combination of the optical axes is also done before the projection lens (3) and where a DLP system is used as imaging system (2), the reflective coating (71) from the previous embodiment as was illustrated in FIG. 6 is absent. The projector provides illumination optics (82), (89) and (90) to image the exit of an integrator rod (100) onto the imaging chips. A dichroic mirror (83) is introduced between these optics to combine the optical axis of the detection light (12) from the detection subsystem (91) with the source light (500) from the integrator rod (100). In this embodiment the coatings of the colour splitting prism (130) can be selected and applied in such a way that the detection light is directed towards a selected imaging chip (140c), (140b) or (140a), by selecting the coating according to the specific wavelength of the detection light. In this embodiment, the detection light (12) will hit on the selected imaging chip and be combined with the projection light (510) when the imaging chip is in the on-state. Assuming that it is possible to complete the safety detection in a small time period, it is then possible to put the all the pixels of the selected imaging chip in their on-state during the time period that the projection light source (1) or at least the component of the projection light source that needs to be reflected by the selected imaging chip (500a), (500b) or (500c) is shut down. However, this embodiment limits the detection period to the time that at least the component of the projection light source is shut down. However, when using a detection sensor that requires a significant amount of time to perform a reliable detection at acceptable illumination levels, for example a ToF detection sensor, it might not be practical nor cost effective to shut off the said component of the projection light source for that long. Therefore, a second detection subsystem (85) as illustrated in FIG. 7 can be added. The detection subsystem (85) can then be positioned in such a way that its detection source light (11) will travel in the direction of projection light source when the pixels of the selected imaging chip are in the off-state position, i.e. when the projection source light is directed to the off-state heat sink (73). The detected light will then either be directed towards the first detection subsystem (91) along the illumination axis (12) or towards the second detection subsystem (85) along the off-state light axis (88). If the signals from both detection subsystems (85) and (91) are added together, detection of an object on the projected light beam will still be guaranteed. A symmetric or dual TIR prism (120) disclosed earlier in WO2008155367 could be used to create the detection path (88) in the off-state direction.

Figure 8:
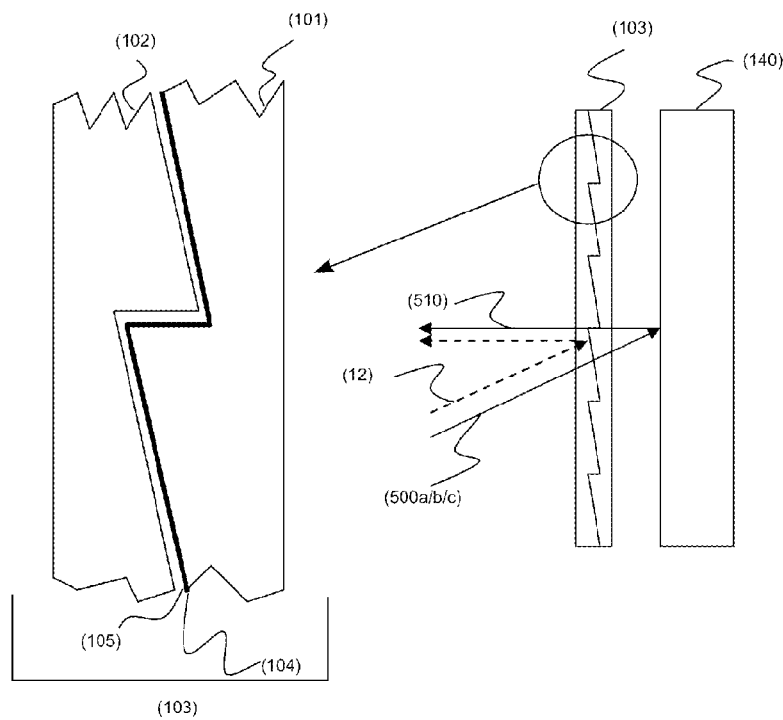
FIG. 8 shows a reflective structure of the preferred embodiment of the system of the invention.

In another embodiment, a similar setup is provided as in FIG. 8 using a detection subsystem (91) of which the optical path (12) is combined with the optical path of one component (500a), (500b) or (500c) of the projection light source. However, as illustrated in FIG. 8, not the on-state reflection of the selected imaging chip, i.e. (140c) or (140b) or (140a), is used to reflect the detection light (12), but a slanted reflecting structure (103) in between the selected imaging chip and the prism. The angle of this structure (103) is matched to the on-state angle of the selected imaging chip, such that the detection light (12) is reflected in the same direction as the on-state light (510) of the selected imaging chip, but independent from its on- or off-state. In a practical setup, the space between the prism and the selected imaging chip is too limited to allow a monolithic glass substrate covered with a reflective coating (105) to be inserted at the needed 12 degree angle. Furthermore, if a glass plate is inserted at this position under an angle, it would introduce astigmatism in the selected component of the projected light. Therefore, 2 optically bonded micro-structured glass plates (101) and (102) can be used as illustrated in FIG. 8. The detection light will then be reflected at the desired angle but for the selected projection light component, the structure will behave as a transparent parallel glass plate. If the thickness is limited, the effect on the imaging of the selected projection light component is negligible. In a single-chip structure, the bonded micro-structured plates (101) and (102) are inserted between the TIR prism and the DMD imagine chip.

It is possible to combine the principles described in the embodiments using a DLP system and put the detection sensor and the detection source light source separately at either of the positions illustrated in FIG. 7. Their respective optical axes are then combined based on polarization using a component with a dichroic coating that is polarization selective for the detection light source and polarization independent for the projection light source. One can, for example, integrate the detection light source with the projection light sources and send a detection pulse via the selected imaging chip that is put in the on-state during a time where the selected component of the projection light source is idle. The TIR prism surface is then coated with a dichroic coating that transmits all the visible on-state light as well as part of the detection pulse with a preferred polarization direction, while it reflects detection light with the orthogonal polarization direction. The same coating on the TIR prism will direct part (the part with appropriate polarization) of the reflected detection light that is received via the projection lens towards the detection sensor via an elongated TIR prism.

When designing the optics that are common for both the detection light as well as the projection light, the anti-reflections coatings should be effective for both the wavelength of the projection light as well as the detection light. The dichroic mirrors should have high reflectivity in the spectrum of both the projection and detection light. Also, where it is desired that the detection light and the selected component of the projection light are split off towards the same DMD, the dichroic coatings should be reflective for both the selected component of the projection light as well as for the detection light. No coatings that block the detection light should be used, except where the slanted reflective microstructure is used.

Figure 9:
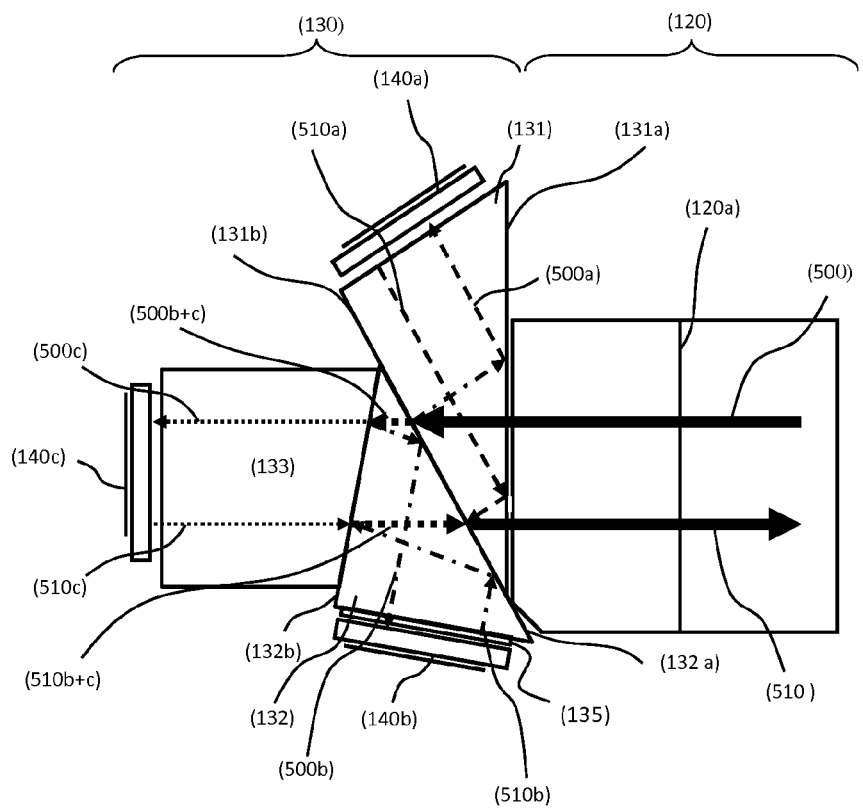
FIG. 9 shows a top view of the imaging system according to the preferred embodiment of the invention.
Figure 10:
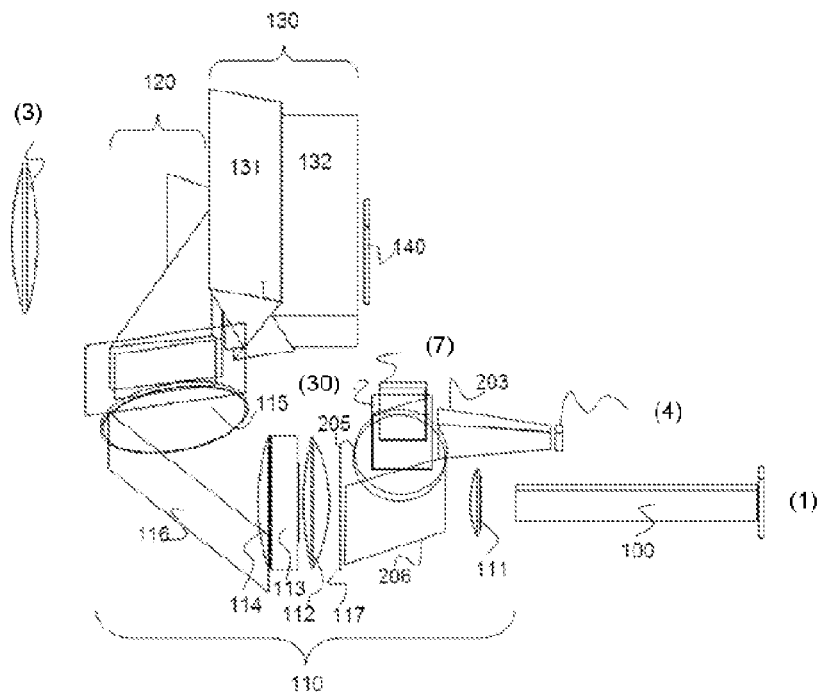
FIG. 10 shows the preferred embodiment of the system of the invention.

In a preferred embodiment a 3-chip DLP projector is used as imaging system as illustrated in FIG. 9 and FIG. 10. When looking at the light path of the 3-chip DLP projector, different elements can be identified from the projection light source (1) to the projection lens (3) onwards. As light source (1) an RGB laser light is used and coupled to an optical integrator (100). At the exit of the optical integrator system a uniform light spot is achieved. This light spot is then imaged onto the DMD imagers (140) by means of the relay lens system (110). The relay lens system consists of various individual lens elements (111) till (115), a folding mirror (116) and aperture (117). The TIR prism assembly (120) sends the light towards the DMD imagers (140). A colour splitting prism (130) is placed between the TIR prism assembly (120) and the imagers (140). The system uses 0.95" DMD imagers with a 1920×1080 resolution. The size of the active area is approximately 20.7 mm×11.7 mm. The colour prism assembly (120) will split the light in its 3 spectral components, send it to the respective imager (140) and recombine the 3 spectral components into a single output beam towards the projection lens (3). An eye safety detection subsystem is inserted in the illumination system between lens element (111) and lens element (112). As detection sensor (7) in the detection subsystem, a time-of-flight sensor is combined on the same optical axis with an Infra-Red (IR) LED detection light source (4) via the polarizing beam splitter (30). The light from the IR LED detection light source (4) is passing through a hollow tapered integrating rod (203). The internal walls of the hollow integrating rod are covered with a reflective silver coating. The exit area of the tapered integrator and the sensing area of the time-off-flight sensor are chosen to be similar in size. The time-of-flight sensor can be larger, with the effect that only a part of the sensor is effectively used for detection in the area of interest and therefore the resolution of the measurement is reduced. For the time-of-flight sensor the 19 k-S3 imager from PMD technologies GmbH is used. This sensor has an active area of 7.2 mm×5.4 mm and a resolution of 160×120 pixels. Since the width of this sensor is smaller than the width of the DMD, this sensor needs to be imaged onto the plane of the DMD with a magnification of at least 2.89 times. To accommodate a 10% larger detection area the magnification factor is chosen to be 3.15. In the vertical direction some rows of the time-off-flight sensor will remain unutilized, reducing the actual resolution to around 160×90 pixels. The sensor allows setting the area of interest accordingly. Because of the 3.15 magnification, also the acceptance angle of +/−12 degrees at the DMD is transformed to +/−38 degrees at the sensor. Part of this magnification is provided by the lenses 112 till 115. Lens system 205 provides the remainder of the required magnification. Note that the DMD is tilted 12 degrees versus the optical axis of illumination system, in order to maintain the best possible focus on the time-of-flight detection sensor; also the detection sensor is tilted to provide the proper scheimpflug correction. Even if this results in a geometric distortion of the detected image, this has limited influence on the ability of the system to properly detect the presence of a person or object in the protected space. The width of the exit of the tapered hollow integrator (203) is slightly larger than the width of the detection sensor. The aspect ratio of the exit of the hollow integrator is identical to the aspect ratio of the DMD. The exit dimensions are 7.5 mm×4.2 mm.

An Osram SFH 4750 IR LED is used as the IR detection light source (4). The active chip area is 5.4 mm×2.1 mm and the emission wavelength is 850 nm. The entrance of the tapered hollow integrator (203) is matched to the size and positioned closely to the active area of the IR LED detection light source (4). Because of the tapering of the integrator, the acceptance angle for the IR detection light source becomes +/−52 degrees (7.5/5.4×38 degrees) along the long axis of the integrator and +/−76 degrees (4.2/2.1×38 degrees) along the short axis of the integrator. The system therefore couples the majority of the light from the IR LED detection light source to the detection subsystem. But more importantly the complete angular space of the projection system is filled with IR light. The SFH 4750 IR LED is capable of delivering a peak optical power of 14 W and an average power of 3.5 W. The polarizing beam splitter reduces this output by half. Assuming a transmission of 60% through the optical path and projection lens, the peak output power will be 4.2 W and the average power 1 W. The output power however has to be limited also to guarantee that the IR levels in front of the projection lens are below the Class 1 acceptable exposure limits of laser safety standard IEC 60825-1. From a position close to the lens, we can assume the angular subtence of the source to be above 100 mRad. In this case the maximum average power within a 7 mm diameter pupil is 0.029 W. When the spot size is 50×28 mm at the front glass of the projection lens, the maximum IR power should be limited to around 1 W, which is corresponding to the estimated output power.

To operate with the 19 k-S3 time-of-flight sensor, the IR LED is operated in pulsed regime with repetition rates up to 80 MHz. To meet Class 1 requirements of the laser safety standard IEC 60825-1 also the energy within a single pulse should be limited to be below 26.5 µJ. At 4.2 W peak power, the pulse duration should therefore be shorter than 6.3 µs. For repetition rates in the MHz and 10's of MHz rate, this requirement is easily met. The repetition rate is selected such that reflections from the screen are extinct before a new measurement is started. For example if the screen is at 30 m distance, reflections will be received after 0.2 µs. A repetition rate below 5 MHz would then guarantee that reflections from the screen cannot interfere with subsequent measurements. The colour prism assembly (130) includes 1 prismatic element per primary colour onto which the DMD device (140) for that specific colour is attached. The colour prism includes a prismatic element (131) onto which the blue DMD is attached, a prismatic element (132) onto which the red DMD is attached and a prismatic element (133) onto which the green DMD is attached. Before each respective DMD there is an aperture plate (134) to block light outside the active area of the DMD. In front of the aperture (134b) of the red DMD, a bonded slanted microstructure with IR reflective coating is attached. The surface of the blue prism (131) adjacent to the red prism (132) is covered with a dichroic coating that will reflect the blue light and passes the red, infrared and green light. The surface of red prism (132) adjacent to the green prism is covered with a dichroic coating that will reflect the red and infrared light while it passes the green light. The infrared light will be reflected off the slanted microstructure before it reaches the aperture (134b). Together with the red, green and blue on-state light (510), it travels towards the projection lens. Light reflected back from the scene in front of the projection lens will travel the reverse IR light path and be imaged onto the time-off-flight sensor.

The invention claimed is:

1. A projection system including a safety detection system for a protected space, said projection system including a projection light source, a projection imaging system, a projection lens system, a detection light source and a detection sensor, further comprising an optical component configured to combine the optical axes of the detection sensor and detection light source with the optical axis of the projection light source within the projection lens system, wherein a detection subsystem has the optical component configured to combine the optical axis of the detection light source and the optical axis of the detection sensor.

2. The projection system according to claim 1, wherein the detection sensor is a Time of Flight sensor.

3. The projection system according to claim 1, wherein the detection light source is an Infra-Red light source.

4. The projection system according to claim 1, wherein said optical component configured to combine the optical axis of the detection light source and the optical axis of the detection sensor is a beam splitter.

5. The projection system according to claim 1, wherein said optical component configured to combine the optical axis of the detection light source and the optical axis of the detection sensor is a light guide.

6. The projection system according to claim 1, wherein said optical component configured to combine the optical axis of the detection light source and the optical axis of the detection sensor are photosensitive elements and detection light emitting elements that are integrated on a single semiconductor substrate.

7. The projection system according to claim 1, wherein the projection imaging system is a Digital Light Processing (DLP) system comprising a colour prism assembly including 1 prismatic element per primary colour onto which a DMD device for that specific colour is attached; and also comprising a TIR prism assembly.

8. A projection system including a safety detection system for a protected space, said projection system including a projection light source, a projection imaging system, a projection lens system, a detection light source and a detection sensor, and further comprising an optical component configured to combine the optical axes of the detection sensor and detection light source with the optical axis of the projection light source before the projection lens system, further comprising a detection subsystem having the optical component configured to combine the optical axis of the detection light source and the optical axis of the detection sensor.

9. The projection system according to claim 8, wherein the detection sensor is a Time of Flight sensor.

10. The projection system according to claim 8, wherein the detection light source is an Infra-Red light source.

11. The projection system according to claim 8, wherein said optical component configured to combine the optical axis of the detection light source and the optical axis of the detection sensor is a beam splitter.

12. The projection system according to claim 8, wherein said optical component configured to combine the optical axis of the detection light source and the optical axis of the detection sensor is a light guide.

13. The projection system according to claim 8, wherein said optical component configured to combine the optical axis of the detection source and the optical axis of the detection light sensor are photosensitive elements and detection light emitting elements that are integrated on a single semiconductor substrate.

14. The projection system according to claim 8, wherein the imaging system is a Digital Light Processing (DLP) system comprising of a colour prism assembly including 1 prismatic element per primary colour onto which a DMD device for that specific colour is attached; and also comprising a TIR prism assembly.

15. The projection system according to claim 14, wherein a dichroic mirror combines the optical axis of the projection light source with the optical axis of the detection sensor and the detection light source before entering the TIR prism assembly; and wherein partially reflective coatings of the colour prism assembly are selected such that the detection light and reflected detection light is guided towards the red DMD; and wherein in front of the red DMD, a bonded slanted microstructure with IR reflective coating is attached.

16. A projection system including a safety detection system for a protected space, said projection system including a projection light source, a projection imaging system, a projection lens system, a detection sub-system comprising at least a detection light source and a detection camera comprising at least a detection sensor, wherein any object in the protected space is illuminated by a detection source cone and detected as it falls within a camera detection cone, so blind spots are excluded, wherein the detection subsystem includes an optical component configured to combine an optical axis of the detection light source and an optical axis of the detection sensor.

17. The projection system according to claim 16, wherein the detection sensor is a Time of Flight sensor.

18. The projection system according to claim 16, wherein the detection light source is an Infra-Red light source.

19. The projection system according to claim 16, wherein said optical component configured to combine the optical axis of the detection light source and the optical axis of the detection sensor is a beam splitter.

20. The projection system according to claim 16, wherein said optical component configured to combine the optical axis of the detection light source and the optical axis of the detection sensor is a light guide.

21. The projection system according to claim 16, wherein said optical component configured to combining the optical axis of the detection light source and the optical axis of the detection sensor are photosensitive elements and detection light emitting elements that are integrated on a single semiconductor substrate.

22. The projection system according to claim 16, wherein the projection imaging system is a Digital Light Processing (DLP) system comprising a colour prism assembly including 1 prismatic element per primary colour onto which a DMD device for that specific colour is attached; and also comprising a TIR prism assembly.

23. The projection system according to claim 22, wherein a dichroic mirror combines the optical axis of the projection light source with the optical axis of the detection sensor and detection light source before entering the TIR prism assembly; and wherein partially reflective coatings of the colour prism assembly are selected such that the detection light and reflected detection light is guided towards a red DMD; and wherein in front of the red DMD, a bonded slanted microstructure with IR reflective coating is attached.

24. The projection system according to claim 16, wherein at least a part of the projection lens system also serves as a lens of the detection camera.

25. A projection system including a safety detection system for a protected space, said projection system including a projection light source, a projection imaging system, a projection lens system, a detection light source and a detection sensor, and further comprising an optical component configured to combine the optical axes of the detection sensor and detection light source with the optical axis of the projection light source within the projection lens system, wherein the projection imaging system is a Digital Light Processing (DLP) system comprising a colour prism assembly including 1 prismatic element per primary colour onto which a DMD device for that specific colour is attached; and also comprising a TIR prism assembly, wherein a dichroic mirror combines the optical axis of the projection light source with the optical axis of the detection sensor and detection light source before entering the TIR prism assembly; and wherein partially reflective coatings of the colour prism assembly are selected such that the detection light and reflected detection light is guided towards a red DMD; and wherein in front of the red DMD, a bonded slanted microstructure with IR reflective coating is attached.

26. The projection system according to claim 25, wherein the detection sensor is a Time of Flight sensor.

27. The projection system according to claim 25, wherein the detection light source is an Infra-Red light source.

28. The projection system according to claim 25, wherein said optical component configured to combining the optical axis of the detection light source and the optical axis of the detection sensor is a beam splitter.

29. The projection system according to claim 25, wherein said optical component configured to combining the optical axis of the detection light source and the optical axis of the detection sensor is a light guide.

30. The projection system according to claim 25, wherein said optical component configured to combining the optical axis of the detection light source and the optical axis of the detection sensor are photosensitive elements and detection light emitting elements that are integrated on a single semiconductor substrate.

* * * * *